United States Patent [19]

Weiss

[11] 4,245,285
[45] Jan. 13, 1981

[54] BOOSTER-INVERTER POWER SUPPLY CIRCUIT

[75] Inventor: Ernest Weiss, Coral Springs, Fla.

[73] Assignee: Burroughs Corporation, Detroit, Mich.

[21] Appl. No.: 71,525

[22] Filed: Aug. 31, 1979

[51] Int. Cl.³ .................. H02P 13/22; H02M 3/335
[52] U.S. Cl. ............................ 363/17; 323/222; 363/132
[58] Field of Search .................. 363/15–17, 363/71, 98, 132, 131; 323/17, DIG. 1

[56] References Cited

U.S. PATENT DOCUMENTS

| | | | |
|---|---|---|---|
| 3,745,443 | 7/1973 | Weil | 323/DIG. 1 |
| 4,035,710 | 7/1977 | Joyce | 323/DIG. 1 |

FOREIGN PATENT DOCUMENTS

| | | | |
|---|---|---|---|
| 1391902 | 4/1975 | United Kingdom | 363/17 |
| 497691 | 12/1975 | U.S.S.R. | 323/DIG. 1 |
| 502377 | 4/1976 | U.S.S.R. | 323/DIG. 1 |

*Primary Examiner*—William H. Beha, Jr.
*Attorney, Agent, or Firm*—Kevin R. Peterson; David G. Rasmussen; Edmund M. Chung

[57] ABSTRACT

The invention is a booster-inverter power supply circuit for providing a regulated, inverted DC output. It is made up of a conventional booster-regulator power supply circuit and improved by the addition of an inverter circuit. The conventional booster-regulator circuit includes an unregulated DC input, a booster choke for receiving the DC input, a switch for controlling the booster choke, a voltage to pulsewidth control connected to the switch for controlling the switch, an AC to DC converter for providing a DC to the voltage to pulsewidth control, and an output circuit having an output diode. The circuit is improved by the addition of the inverter circuit having an inverter transformer and a voltage control circuit. The inverter transformer is connected at one end to the switch, the booster choke, and the output diode. The switch controls the voltage on the inverter transformer. The output of the inverter transformer is a regulated AC output fed to the AC to DC converter. The voltage control circuit is connected to the other end of said inverter transformer for maintaining a constant voltage.

9 Claims, 4 Drawing Figures (PRIOR ART) BOOSTER
REGULATOR CIRCUIT (PRIOR ART) HALF
BRIDGE INVERTER

1

BOOSTER-INVERTER POWER SUPPLY CIRCUIT

BACKGROUND OF THE INVENTION

1. Field of the Invention

The invention relates to a booster-inverter power supply. More specifically, the invention relates to a booster-regulator circuit improved by the addition of an inverter circuit having an inverter transformer and a voltage control circuit. 2. Description of the Prior Art In many computer applications it is desirable to be able to take an unregulted DC voltage which may vary for example from 100v–450v and obtain a regulated inverted DC output. In the past this has been done by using a conventional booster-regulator circuit which will take the unregulated DC and generate a boosted, regulated DC which may, for example, be 500v±1%. The regulated DC will then be fed to a conventional half or full bridge inverter which will invert the regulated DC.

Normally the prior art booster-regulator circuit and the prior art half or full bridge inverter are both discrete circuits. It would be desirable to incorporate both the functions of the booster circuit and the inverter circuit into a single circuit and reduce the number of components used.

SUMMARY OF THE INVENTION

In the present invention the prior art booster circuit and portions of the prior art half-bridge inverter have been combined into a singled novel circuit which provides a regulated, inverted DC output. The novel circuit includes a conventional booster-regulator power supply circuit for providing a regulated DC output. The booster-regulator circuit contains a DC input, a booster choke receiving the DC input, a voltage to pulse-width modulation control for controlling the duty cycle time of the switch and an output circuit made up of an output diode and an output capacitor. The improvement comprises an inverter circuit which has an inverter transformer and a voltage control circuit. The inverter transformer is connected at one end to the switch. The switch controls the voltage on the inverter transformer. The voltage control circuit is connected to the other end of the inverter transformer and maintains a constant voltage at the other end. The switch operates between the DC return voltage and the boosted DC voltage and therefore the inverter transformer operates between these two voltages. The output from the secondary of the inverter transformer is a regulated AC. This AC is fed to a rectifier which produces a regulated inverted DC. Part of the rectifier output is used as feedback to the voltage to pulsewidth modulation control to control the switch.

The novel feature of the invention is the addition of the inverter circuit including the inverter transformer and voltage control circuit to the booster-regulator circuit.

The invention recognizes that the combination of the switch, booster choke, and diode of the booster circuit will perform the same function as a pair of switches in the half-bridge inverter circuit when the inverter circuit is combined with the booster circuit. The combination of the two circuits eliminates two swtiches thus making the circuit simpler and lower cost.

The invention further recognizes that even though the two prior art circuits have different duty cycles and could not normally be combined, if a change in value is made in the inverter transformer the combination may be made.

DETAILED DESCRIPTION OF THE PREFERRED EMBODIMENT(S)

Figure 1:
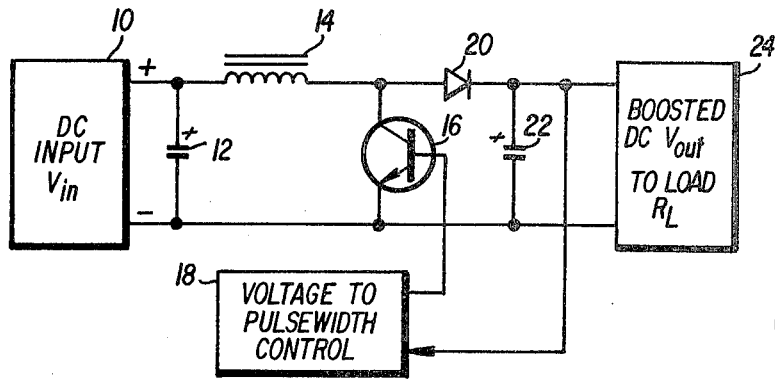
FIG. 1 is a schematic drawing of a prior art booster-regulator circuit.

FIG. 1 shows an example of a prior art booster-regulator power supply circuit. The circuit is designed to take a widely varying unregulted DC, and produce a regulated DC having a value greater than the largest fluctuation in he unregulated DC. For example, the unregulated DC may vary from 100v–450v. The regulated DC output is a regulted voltage larger than 450v, for example 500v±1%.

The DC input may be from any conventional DC source 10 and is designated $V_{in}$. A capacitor 12 having a value 3300 μfd is connected across the DC input. A booster choke 14 having a value 1.5 mH is connected to the positive side of the capacitor. The other end of the booster choke is connected to a switch 16 which connects the end of the booster choke to the DC return. Switch 16 is a conventional transistor switch controlled by a pulsewidth modulation control 18 for example, a Silicon General I.C.: SG 1524 switch. This control produces a modulation signal which is asymmetric and causes the output to be $$V_{out} = \frac{V_{in}}{1 - \frac{t}{\tau}}$$

where
  t is the switch "ON" time
  $\tau$ is the period of one cycle.
Connected across switch 16 is an output circuit comprised of a diode 20 and an output capacitor 22 having a value 800 μfd.

The load is connected across output capacitor 22 and receives $V_{out}$. This same voltage is fed back to pulse-width modulation control 18.

Figure 2:
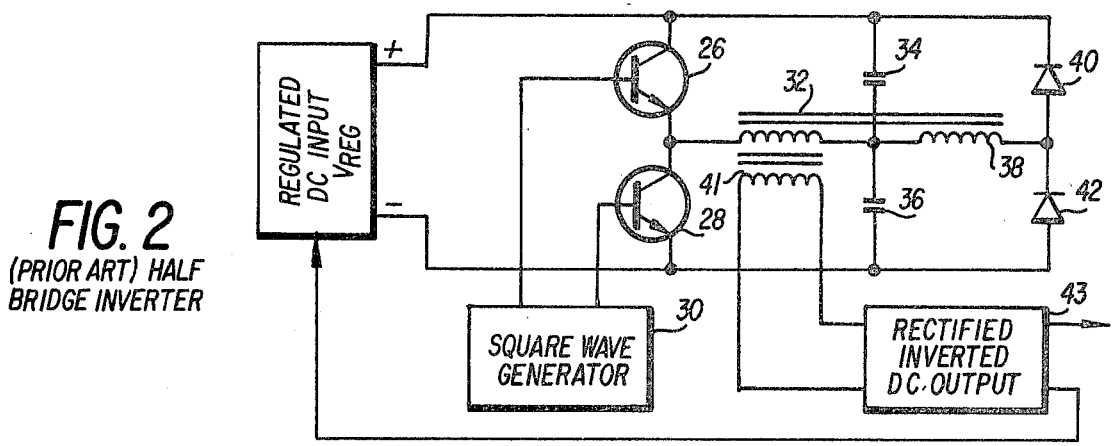
FIG. 2 is a schematic drawing of a prior art half-bridge inverter.

FIG. 2 shows a prior art half-bridge inverter. The DC input is regulated and may be the output of the booster circuit of FIG. 1. A pair of series switches 26 and 28 are connected across the DC input. These switches may be conventional trnasistors operating in a switching mode. The switches are normally controlled by a square wave generator 30. An inverter transformer 32 has one end connected between series switches 26, 28. The center tap of inverter transformer 32 is connected between two capacitors 34 and 36 having equal values. These capacitors are in series across the DC input and maintain a voltage $V_{reg}/2$ at the center tap of inverter transformer 32.

Normally capacitors 34, 36 are the only circuitry needed to maitain a voltage of $V_{reg}/2$. In this case a capacitor voltage equalizer transformer winding 38, and a pair of series diodes 40, 42 are used. Capacitor voltage equalizer winding 38 is the second half of inverter transormer 32. One end of transformer winding 38 is connected between capacitors 34, 36. The other end is connected between diodes 40, 42 which are in series across capacitors 34, 36. Transformer winding 38 and diodes 40, 42 prevent the voltage between capacitors 34, 36 from drifting. The use of transformer winding 38 and diodes 40, 42 are well-known in the art.

The output of the half-bridge inverter is a regulated AC taken across a secondary winding 41 of inverter transformer 32. The AC signal is fed to rectifier 43 which produces a regulated, inverted DC output. The level of the DC output is determined by the value of inverter transformer 32.

If the input to the half-bridge inverter is from the booster circuit of FIG. 1, part of the output of rectifier 43 is fed back to voltage to pulsewidth control 18 of FIG. 1. This controls the level of the rectified DC output of the half-bridge inverter. If the input to the half-bridge inverter is a regulated DC input from another type DC regulator, part of the output of rectifier 43 is fed back to the DC regulator as shown in FIG. 2 to control the rectified DC output.

Figure 3:
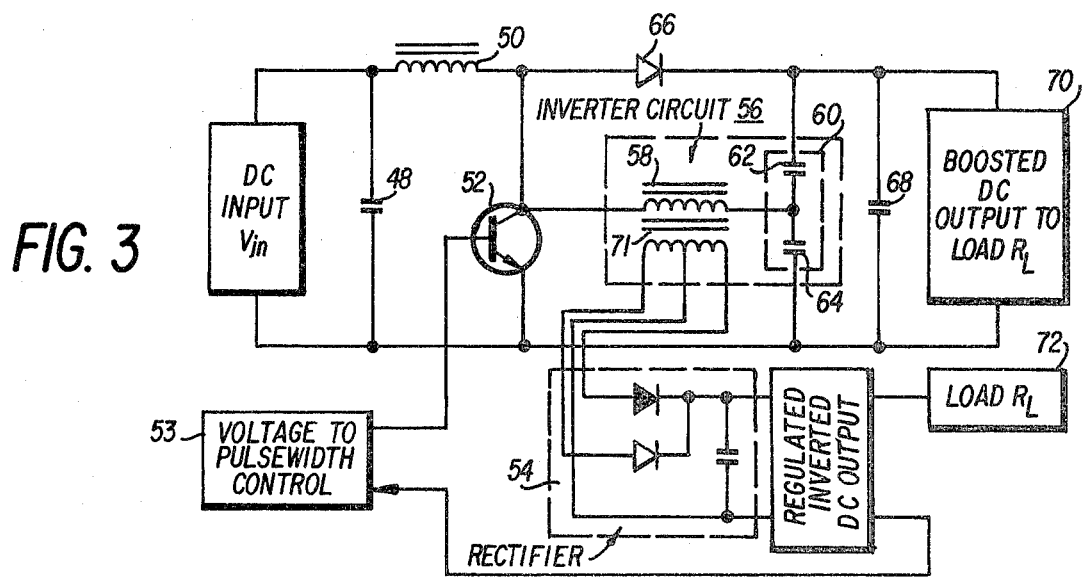
FIG. 3 is a schematic drawing of the booster-regulator circuit of FIG. 1 improved by the use of an inverter circuit.

FIG. 3 shows the booster-inverter circuit of the invention. The purpose of the circuit is to provide a regulated, inverted DC the same as would be produced if the output of the booster-regulator circuit of FIG. 1 were fed to the inverter circuit of FIG. 2.

The DC input is an unregulated input $V_{in}$ the same as in FIG. 1. Across the DC input is a capacitor 48 having a value of 3300 μfd. A booster choke 50 having a value 1.5 mH is connected to the positive side of capacitor 48. A switch 52 is connected between the other end of the booster choke and the DC return. Switch 52 is a conventional transistor switch. It is controlled by voltage to pulsewidth control 53 which is in turn controlled by feedback from rectifier 54. Voltage to pulsewidth control 53 is the same as voltage to pulsewidth control 18 of FIG. 1. Inverter circuit 56 is connected to switch 52 and to booster choke 50. Inverter circuit 56 is made up of inverter transformer 58 voltage control circuit 60.

Inverter transformer 56 is of a different value than inverter transformer 32 of FIG. 2. The reason for this is that the duty cycle of the inverter circuit of FIG. 2 is different than that of the booster-regulator of FIG. 1 or booster-inverter of FIG. 3.

voltage control circuit 60 is made up of a pair of capacitors 62, 64 haviang values of 5 μfd. Inverter transformer 58 is connected between the capacitors. Capacitors 62, 64 maintain a voltage of approximately Vin/2 at the end of inverter transformer 58. A diode 66 is connected between booster choke 50 and the positive side of capacitor 62. An output capacitor 68 having a value of 800 μfd is connected between diode 66 and the DC return. Connected across output capacitor 68 is the load 70. Load 70 receives a regulated DC output. The output at this point is not inverted and is a conventional regulated DC output. The output is not electrically isolated from the input.

A regulated AC output is obtained across the secondary winding 71 of inverter transformer 58. The level of the AC output may be controlled by the appropriate selection of the value of inverter transformer 58. This output may be fed to conventional rectifier 54 made up of a pair of diodes and a capacitor. The output of rectifier 54 is an inverted, rectified DC output, that is, electrically isolated from the input. The output is fed to a load 72 and is used as feedback to voltage to pulsewidth control 53.

Figure 4:
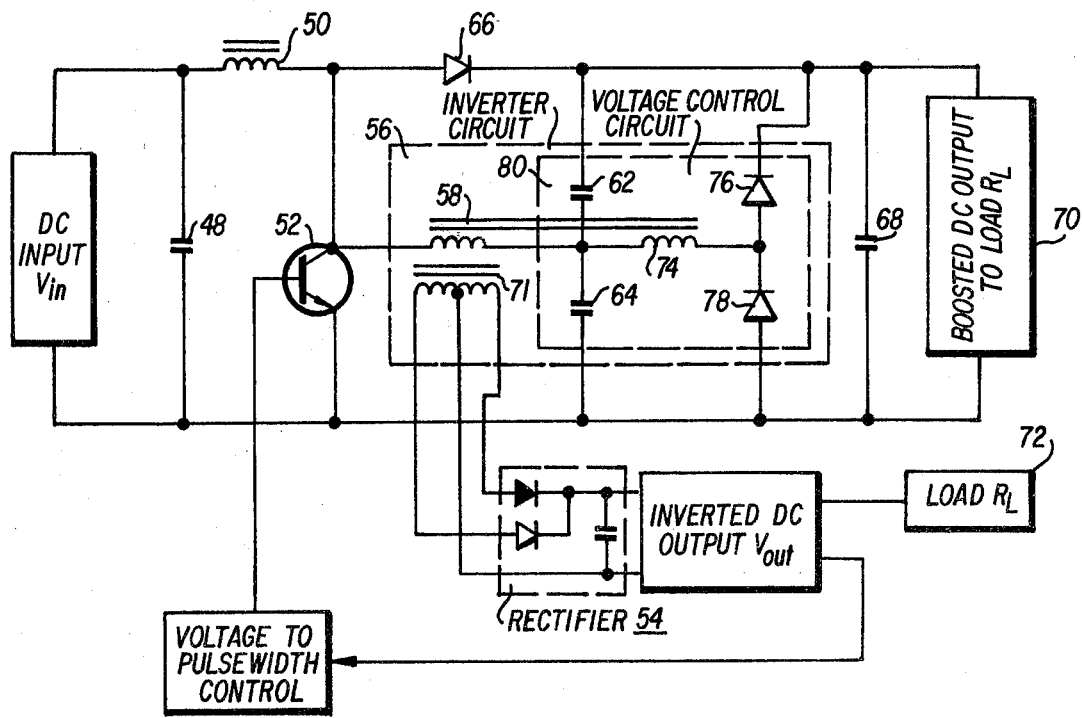
FIG. 4 is an alternative embodiment of the circuit shown in FIG. 3 having additional voltage control circuity.

FIG. 4 is an alternative embodiment of the booster-inverter circuit of FIG. 3. The circuits are identical in all respects except for the addition of a capacitor voltage equalizer transformer winding 74 and diodes 76 and 78 which make up a voltage control circuit 80. Capacitor voltage equalizer transformer winding 74 is one-half of inverter transformer 58 which is center tapped. One end of capacitor voltage equalizer transformer winding 74 is connected between capacitors 62 and 64. The other end is connected between diodes 76 and 78. The diodes are in series between diode 66 and the DC return. The purpose of capacitor voltage equalizer transformer winding 74 and diodes 76, 78 is to stabilize the voltage between capacitors 62 and 64 at $V_{in}/2$ if the voltage drifts. All other components in FIG. 4 are similarly numbered to those of FIG. 3 and operate in a similar manner.

The addition of equalizer transformer winding 74 and diodes 76 and 78 is unnecessary to the booster-inverter circuit in most cases.

In operation the prior art booster-regulator circuit of FIG. 1 works as follows. The unregulated DC is applied across capacitor 12. Pulsewidth modulation control 18 produces an asymmetric waveform that operates switch 16. When switch 16 closes, booster choke 14 stores up energy. Diode 20 prevents capacitor 22 from discharging during this period and maintains the voltage across capacitor 22.

When switch 16 opens, booster choke 14 discharges its stored energy through diode 20 and builds up the potential across capacitor 22. The potential across capacitor 22 will be larger than the largest fluctuation of the allowed range of unregulated DC inputs. For example, if the unregulated DC varies from 100v to 450v the regulated DC may be 500v ±1%. As shown for FIG. 1, the output will be controlled by voltage to pulsewidth control 18 and will be $V_{out}=V_{in}/1-t/\tau$. The waveshape of voltage to pulsewidth control 18 is asymmetric to increase the duty cycle. This is important in obtaining the high level of output voltage.

The output of the booster-regulator circuit is applied to the prior art, half-bridge inverter of FIG. 2. The half-bridge inverter works as follows. The voltage at one end of inverter transformer 32 which is connected between capacitors 34 and 36 is maintained at a constant potential of $V_{reg}/2$. The voltage at the other end of inverter transformer 32 is controlled by switches 26 and 28 and may vary between the DC input $V_{reg}$ and the DC return. When switch 26 is open and switch 28 is closed inverter transformer 32 will be at the full DC potential $V_{reg}$. Therefore, by controlling switches 26 and 28 a regulated AC may be felt at inverter transformer 32.

Normally, only capacitors 34 and 36 are needed to keep the voltage between them at $V_{reg}/2$. However, if further stabilization is necessary the network of capacitor voltage equalizer transformer winding 38 and diodes 40 and 42 will maintain the voltage at $V_{reg}/2$. For example, if the voltage between capacitors 34 and 36 should go above $V_{reg}/2$ the increased voltage would cause diode 42 to begin conducting thereby causing capacitor 34 to charge somewhat until the voltage equalizes out again at $V_{reg}/2$. If the voltage between capacitors 34 to 36 is low, diode 40 will begin conducting causing capacitor 36 to charge and raise the voltage to $V_{reg}/2$.

The output of inverter transformer 32 will be a regulated AC taken across the secondary of transformer 32.

This output is fed to rectifier 43 to obtain a regulated, inverted DC output.

Looking at the operation of the invention as shown in FIG. 3, the DC input is the same unregulated DC as in FIG. 1. The DC input is applied across capacitor 48. When switch 52 closes, booster choke 50 charges up. While switch 52 is closed diode 66 prevents capacitor 68 from dishcarging. Capacitor 68 thus maintains the charge it has built up on previous cycles. At the same time the end of inverter transformer 58 which is connected to switch 52 is at DC return potential the same as the switch.

When switch 52 opens up, booster choke 50 will dishcarge its sotred energy causing diode 66 to conduct and thereby charging up output capacitor 68 to the output voltage $V_{out}$.

During this period the voltage at the switch 52 end of inverter transformer 58 rises to $V_{out}$. Thus, during the opening and closing of switch 52 the voltage at the switch end of transformer 58 varies between $V_{out}$ and the DC return. The voltage at the other end of the transformer 58 is, therefore, a regulated AC varying between $V_{out}$ and the DC return. This output is fed to rectifier 54 which converts the regulated AC to a regulated, inverted DC output.

The output of rectifier 54 is partially used as feedback to voltage to pulsewidth control 53 which controls switch 52. The feedback controls the time the switch is on for the purpose of keeping the regulated inverted DC output of rectifier 54 constant. The feedback also has the effect of causing the boosted DC output accross capacitor 68 to vary somewhat. This can be seen by looking at the equation for the booseted DC output $$V_{out} = \frac{V_{in}}{1 - \frac{t}{T}}.$$

As t varies to keep the inverted DC output constant the value of $V_{out}$ will change. The boosted DC output is therefore not a completely regulated output but is only quasi-regulated. In summary, the inverted DC output is regulated to be constant while the boosted DC output is only quasi-regulated.

The circuit shown in FIG. 3 uses only one loop to obtain the regulated inverted DC output. Only one loop equation defines the circuit. In the booster-regulator of FIG. 1 and the half-bridge inverter of FIG. 2 a separateindependent control loop is needed for each circuit. The circuits are defined by two independent loop equations. Both circuits are needed to get a regulated, inverted DC output similar to that produced by the circuit of FIG. 3.

The improvement in the circuit of FIG. 3 is the inverter circuit. The rest of the circuitry is similar to the booster circuit shown in FIG. 1. The inverter circuit includes the voltage control circuit made up of capacitors 62, 64 and the inverter transformer 58.

The novelty lies in the recognition that the combination of the switch, booster-choke, and the diode of the booster circuit will perform the same function as the two switches in the half-bridge inverter circuit. In other words, if the half-bridge inverter circuit is incorporated in the booster circuit the combination of the booster choke, switch, and diode of the booster circuit will cause the inverter circuit to operate the same as it would have with the two switches. Therefore, the two switches may be eliminated. The circuit of FIG. 3 is thus able to achieve the same results as the prior art circuit with two less active components.

One other point of novelty lies in the fact that inverter transformer 58 is not the same as inverter transformer 32 of FIG. 2 since the duty cycle of the circuits of FIGS. 2 and 3 are different. Normally it would not be expected that the booster regulator circuit of FIG. 1 and the inverter circuit of FIG. 2 could be combined because of their different duty cycles. The transformer of the inverter circuit would not operate properly with the duty cycle of the booster regulator circuit. The improved circuit of FIG. 3 recognized this and carefully selected the proper value for transformer 58.

An alternative embodiment to the invention is shown in FIG. 4. This circuit will provide better regulation if capacitors 62, 64 do happen to drift. If the voltage between capacitors 64 and 62 begins to rise this will cause diode 78 to begin to conduct somewhat. Capacitor 62 will begin charging and will therefore cause a drop in the voltage between 62 and 64. Likewise, if the voltage between 62 and 64 begins drifting downward diode 76 will begin to conduct slightly and capacitor 64 will begin to charge, thereby raising the voltage between 62 and 64 until it is stabilized at approximately one-half the booster voltage. Otherwise, the circuit worked identically, the same as that shown in FIG. 3.

What is claimed is:

1. In a booster-inverter power supply circuit including an unregulated DC input, a booster choke for receiving the DC input, a switch for controlling the booster choke, a voltage to pulsewidth control connected to said switch for controlling said switch, an AC to DC converter for providing a DC to said voltage to pulsewidth control and an output circuit having an output diode, the improvement comprising:
    an inverter circuit having an inverter transformer and a voltage control circuit, the inverter transformer connected at one end to said switch, said booster choke, and said output diode, said switch controlling the voltage on said inverter transformer, the output of said inverter transformer being a regulated AC output fed to said AC to DC converter, said voltage control circuit being connected to other end of said inverter transformer for maintaining a constant voltage.

2. The apparatus of claim 1 in which said voltage control circuit maitains said constant voltage at approximately one-half of the voltage of said output voltage.

3. The apparatus of claim 1 in which said voltage control circuit is a pair of series capacitors connected through said output diode to said booster transformer, said inverter transformer connected between said pair of series capacitors.

4. The apparatus of claim 2 in which said voltage between said series capacitors is approximately one-half of the voltage of said output circuit.

5. In a booster-inverter power supply circuit having an unregulated DC input, a capacitor across the DC input, a booster choke receiving the unregulated DC input, a switch connected to said booster choke for controlling the booster choke, a voltage to pulsewidth control connected to said switch for controlling said switch, and an output circuit having an output capacitor and an output diode, said output diode connected to said booster choke and said switch, the improvement comprising:
    an inverter circuit having an inverter transformer and a voltage control circuit, the inverter transformer connected at one end to said switch, said booster choke, and said output diode, said switch controlling the voltage on said inverter transformer, the output of said inverter transformer being a regulated AC output, the voltage control circuit being connected to the other end of said inverter transformer for maintaining a constant voltage; and a rectifier circuit for receiving and rectifying the output of said inverter transformer to provide a rectified inverted DC output, a part of said rectifier output being fed back to said voltage to pulsewidth control to control said switch.

6. The apparatus of claim 5 in which said voltage control circuit is a pair of series capacitors connected through said output diode to said booster transformer, said inverter transformer connected between said pair of series capacitors, the voltage between said pair of series capacitors being approximately one half of the voltage across said output capacitors.

7. The apparatus of claim 6 in which said voltage control circuit further comprises:

a pair of series diodes connected across said output capacitor; and a capacitor voltage equalizer transformer winding connected at one end between said pair of series diodes and at the other end between said pair of series diodes for regulating the voltage between said pair of capacitors.

8. A booster-inverter power supply circuit having an unregulated DC input and a DC return comprising:

a booster choke having one end connected to said DC input;

a switch connected between said booster choke and said DC return;

a diode with one end connected to said booster and said switch;

an inverter circuit having an inverter transformer and a voltage control circuit, the inverter transformer connected at one end to said switch, said booster choke, and said output diode, the voltage control circuit being connected to the other end of said inverter transformer, to one end of said diode and to said DC return, whereby the output of said inverter transformer is a regulated DC output.

9. The apparatus of claim 1 in which said voltage control circuit is a pair of capacitors with said other end of said inverter transformer connected between said pair of capacitors, the other end of one of said capacitors connected to said diode, and the other end of the other of said pair of capacitors connected to DC return.

* * * * *